United States Patent [19]

Lindgren

[11] Patent Number: 4,688,679

[45] Date of Patent: Aug. 25, 1987

[54] IMPACT SEPARATOR

[76] Inventor: Peter B. Lindgren, 4491 Crystal Lake Dr., Apt. 205, Pompano Beach, Fla. 33064

[21] Appl. No.: 776,415

[22] Filed: Sep. 16, 1985

[51] Int. Cl.$^4$ ........................ B07B 13/10; A22C 29/04

[52] U.S. Cl. ........................................ 209/691; 17/48; 17/74; 209/699; 209/906; 209/932

[58] Field of Search ............... 209/606, 635, 637, 691, 209/694, 695, 699, 700, 707, 906, 911, 920, 921, 924, 437, 440, 441, 444, 157, 155, 159, 161, 509, 443, 932; 17/48, 51, 74; 99/568, 569, 570; 198/760, 771; 426/478, 479

[56] References Cited

U.S. PATENT DOCUMENTS

| | | | |
|---|---|---|---|
| Re. 31,169 | 3/1983 | Holmes | 209/699 |
| 3,044,621 | 7/1962 | Pearlman et al. | 209/694 |
| 3,347,374 | 10/1967 | Frei | 198/760 X |
| 3,487,924 | 1/1970 | Meyer | 209/694 X |
| 3,680,694 | 8/1972 | Hamann | 209/637 |
| 4,240,903 | 12/1980 | Stoev et al. | 209/437 |

FOREIGN PATENT DOCUMENTS

| | | | |
|---|---|---|---|
| 0057056 | 12/1939 | Denmark | 209/694 |
| 0003481 | 10/1875 | United Kingdom | 209/694 |

*Primary Examiner*—Randolph A. Reese
*Assistant Examiner*—Edward M. Wacyra
*Attorney, Agent, or Firm*—Jack E. Dominik

[57] ABSTRACT

An impact separator has a V-shaped downwardly angled trough vibratorily mounted at its lower end and fixedly resiliently secured at its upper end which is fed at the upper portion with scallop and residual shell and a small amount of water while being vibratorily driven. The meat of the scallop descends downwardly and absorbs the impact of the vibrations while the shell portion is impacted by the walls of the V and eventually tumbles out over the top and descends to a trash tray positioned beneath the V-shaped trough. The scallop flesh travels the full length of the V-shaped trough to an exit hole for further processing including removal of the viscera. The trough is designed at its lower portion to permit a vibratory drive of between 0.100 inches and 0.300 inches. In one embodiment of the separator the vibrations are imparted orbitally. With this construction, and the shaping of the V at the bottom to be substantially the configuration of the bivalve meal processed, approximately 30 gallons per hour of input can be fed into a single tray unit, with an input water of 18 gallons per hour and product withdrawal will exceed 25 gallons per hour. The separator includes mounting the trough at an angle between 10° and 30° to the horizontal, and angling the trash tray at some angle in excess of that of the V-shaped trough mounted above the trash tray. The angle of the trash tray is sufficient to assure the rejected materials will proceed out by gravity force to be discarded.

15 Claims, 7 Drawing Figures

IMPACT SEPARATOR

FIELD OF THE INVENTION

The present invention is directed to an impact separator which has primary utility in the processing of bivalves, and more particularly scallops. Specifically the invention is directed to processing a mixture of scallop and shell and other trash after the scallops have been shucked from the shell, and prior to any further processing to remove the viscera clinging to the meat of the scallop. The structures such as contemplated are generally found in United States Class 17.

SUMMARY OF THE PRIOR ART

In the processing of scallops and many other shell fish, there are essentially three steps: first the shell is removed from the product; secondly the product is separated from residual pieces of shell, barnacles, rock shrimp, crab claws, and the like, and then; thirdly, the meat portion is processed to remove the viscera and other unwanted non-shell parts of the bivalve. The present invention is directed primarily to the second step of separating the meat with its attached viscera from the residual shell and other unwanted materials. The reason for this separation is that counter-rotating rollers are usually employed to remove the viscera. These rollers can be damaged by pieces of shell which are much larger in size than the ordinary fines such as sand or sand size broken shell that one would expect with a product taken from the bed of the sea. Also such pieces are not edible and would have to be otherwise separated out later. Water flume separators are used today to separate unwanted shell, barnacle, sand and other solids from the shucked scallops before they enter the eviscerator machine. The water flume accomplishes the process by floating the almost buoyant scallops or bivalves with turbulent water, which leaves the shell and other heavier solids to sink to be discarded. The water consumption of such a procedure in a typical scallop processing plant can be as high as 100,000 gallons per day. This creates a major problem in two aspects. First, the supply of fresh water which should otherwise be directed to human and agricultural usage is wasted. Secondly, the processing of the effluent can have a very adverse environmental impact when dumped into streams, river mouths, harbor areas, and tributaries. Typical urban sewer systems in the areas where scallops are processed are not adequate to process such quantities of effluent.

What the industry truly needs from an environmental standpoint as well as economies of processing is a method and apparatus for separating unwanted shell, barnacles and other solids from shucked scallops prior to entering into an eviscerator machine which is highly efficient from a standpoint of separation and minimizes the use of water. The requirement is not necessarily to totally purge of all solids, but to rather purge those solids particularly which are large and/or sharp enough to damage the rollers in an eviscerator.

Examples of prior art patents in this field include the following: U.S. Pat. Nos. 2,832,989; 3,206,796; 3,238,560; 3,320,631; 3,662,431; 4,198,728; 4,255,834; 4,361,933.

SUMMARY OF THE INVENTION

The present invention is directed to an impact separator and method in which the impact separator has a V-shaped downwardly angled trough vibratorily mounted at its lower end and fixedly resiliently secured at its upper end which is fed at the upper portion with scallop and residual shell and a small amount of water while being vibratorily driven. The meat of the scallop descends downwardly and absorbs the impact of the vibrations while the shell portion is impacted by the walls of the V and eventually tumbles out over the top and descends to a trash tray positioned beneath the V-shaped trough. The scallop flesh travels the full length of the V-shaped trough to an exit hole for further processing including removal of the viscera. The method is directed to operating such a construction with an exemplary one inch V-shaped trough to vibrate between approximately 500 and 3,000 revolutions per minute. The trough is designed at its lower portion to permit a vibratory drive of between 0.100 inches and 0.300 inches. In one aspect of the method the vibrations are imparted orbitally. With this construction, and the shaping of the V at the bottom to be substantially the configuration of the bivalve meat processed, approximately 30 gallons per hour of input can be fed into a single tray unit, with an input water of 18 gallons per hour and product withdrawal will exceed 25 gallons per hour. The method is also directed to angling the trough at an angle between 10° and 30° to the horizontal, and angling the trash tray at some angle in excess of that of the V-shaped trough mounted above the trash tray. The angle of the trash tray is sufficient to assure the rejected materials will proceed out by gravity force to be discarded.

In view of the foregoing it is a principal object of the present invention to provide an impact separator which will maximize the efficiency of eliminating hard objects from the mix with bivalve meat while minimizing the use of water. A further object of the invention is directed to maximizing this output with minimal damage, if any, to the bivalve meat being processed.

Another and significant object of the present invention is to provide the advantages set forth above in a construction which is simple and inexpensive to manufacture, and very simple to operate, maintain, repair, and service.

BRIEF DESCRIPTION OF THE DRAWINGS

Further objects and advantages of the present invention will become apparent as the following description of an illustrative embodiment proceeds, taken in conjunction with the accompanying drawings, in which.

CONCEPT AND THEORY OF OPERATION

Figure 1:
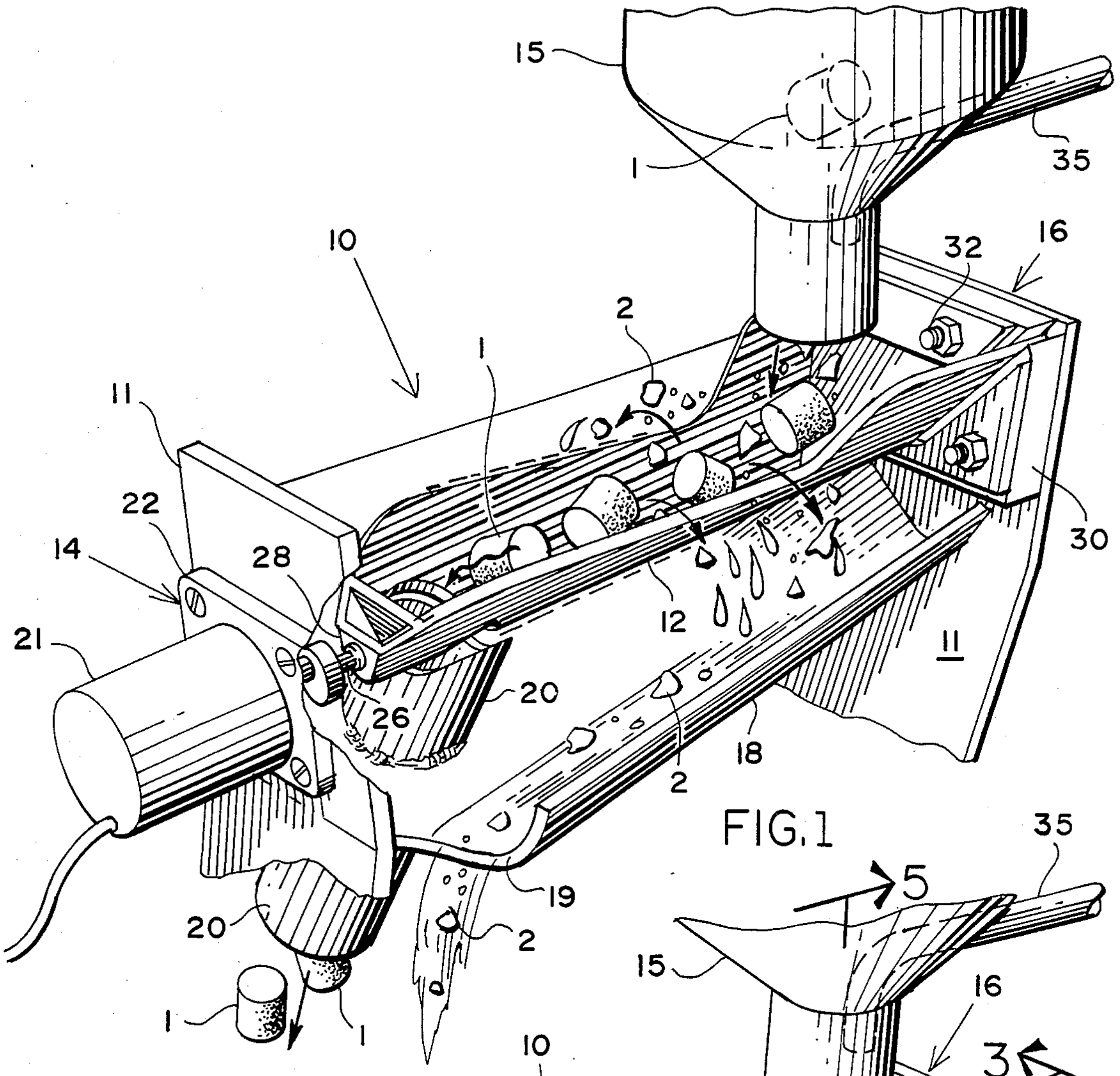
FIG. 1 is a partially diagrammatic operational view of the subject impact separator showing the input, the output, and the discharge of trash. The same is in a perspective partially broken configuration.

In any system where there are two colliding bodies, each body has a momentum change and a change in its kinetic energy. These changes can be predicted with the aid of Newton's 2nd, and the law of Conservation of Energy:

$$F = MA \text{ (Newton's 2nd).}$$

An alternative statement of Newton's 2nd Law of Motion is:

$$F = d(mv)/dt.$$

The collision between two bodies, where relatively large forces result over a comparatively short period of time is called impact. If complete restoration of the energy of deformation occurs, the impact is elastic. If the restoration of energy is in complete, the impact is inelastic.

We can see from the alternative statement of Newton's 2nd Law that as the time duration of a collision is reduced the forces to accelerate an object increase proportionately. This is the case with the collision of most hard materials such as glass, rock, wood, metals, and golf balls because the deformation is small and the collision event time short. Softer materials such as a pillow, when colliding, deform more and have longer contact time, therefore, smaller acceleration forces. When inelastic materials collide they do not return all of the work or kinetic energy to the system. This energy is absorbed as permanent deformation or heat, further reducing the force available for acceleration of the body.

The impact separator uses these principles to separate more elastic materials, (rock, shell, bone, claws, etc.) from less elastic materials, (scallop and fish meat).

The vibrating or oscillating V-shaped trough impacts all of the product entering into it many times. Elastic objects have relatively large forces resulting from these impacts. They quickly accelerate and with repeated impacts, the velocity increases and they cannot remain in the V-shaped trough. The inelastic product absorbs this impact energy and does not build up enough kinetic energy to escape.

Further refinements include:

(1) The addition of a small amount of water. The water helps as a lubricant and it, along with the scallop meats are somewhat held in the bottom of the V-shaped trough by atmospheric pressure and by the liquids surface tension.

(2) Radiusing of the bottom of the V-shaped trough to fit the scallop meats as closely as possible, (approximately ⅜"r). This makes the addition of water even more effective with reduced water flow rates.

(3) Roughing of the V-shaped trough surface. This causes the product to rotate perpendicular to the axis of the V-shaped trough. It allows unwanted product to be turned to the surface so that it can be thrown off without throwing off scallop meats. Since a scallop meat is essentially cylindrical in shape, spinning is another effective mechanism that it can increase its energy without leaving the V-shaped trough.

The impact separator is effectively fine tuned by adjusting the velocity of impact. This is done by adjusting two variables, the stroke or diameter of the orbit and the RPM or speed. With larger orbits (0.250 dia.), lower RPM's (1200–1800) must be used or the scallop meats will not remain in the tray. With smaller orbits (0.180 dia.), much higher RPM's are necessary (2900) to impact and accelerate off the unwanted materials. The smaller orbit with higher RPM approach lends itself better to increasing efficiency with addition of water.

While a circular orbital motion is shown, a rectangular or vibratory motion will also achieve the impact result. The circular orbit is more desirable from a cost and control standpoint.

DESCRIPTION OF A PREFERRED EMBODIMENT

Exemplary Apparatus

An exemplary impact separator 10 is shown in operation in FIG. 1. There it will be seen that the impact separator receives scallops 1 along with a mix of trash and shell 2 admixed with water 3. The impact separator 10 is mounted on a frame 11 and has as its principal operative element a V-shaped trough 12. The V-shaped trough 12 angles downwardly and at its lower portion is driven by an orbital drive 14 (partially shown in FIG. 1 and shown in greater detail in FIG. 3). An input hopper 15 is positioned at the upper portion of the vibratory V-shaped trough 12 and just forwardly and above the fixed mount 16 for the V-shaped trough 12.

Beneath the V-shaped trough 12, which is mounted at an angle in the frame 11 of 5° to 30° with the horizontal is a trash tray 18 having a trash dump 19 at its lower portion. The trash tray is mounted at an angle with the horizontal of 10° to 30° in excess of the angle at which the V-shaped trough 12 is mounted. A product exhaust tube 20 extends from the lower portion of the V-shaped trough 12 and angles off to one side, the side opposite of the trash dump 19 of the trash tray 18. The product exhaust is directed downwardly to a product bucket, or directly to the eviscerator assembly depending upon the organization of the processing plant.

Figure 3:
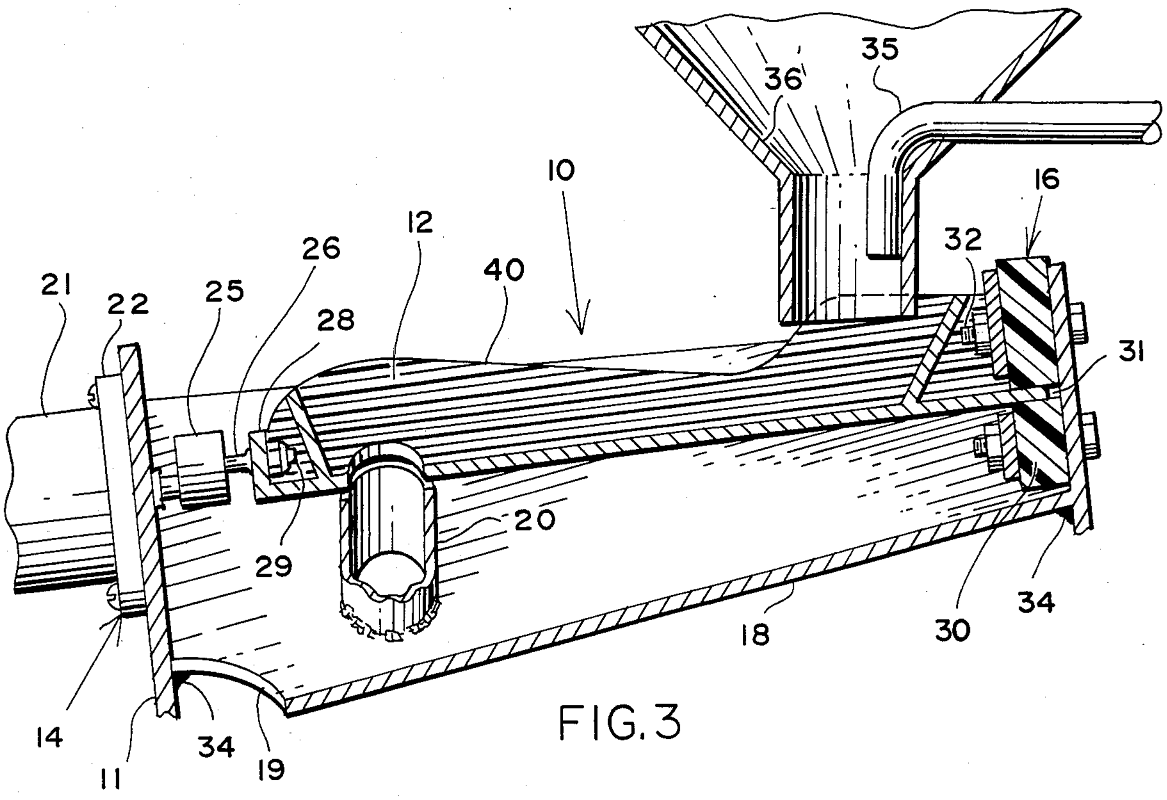
FIG. 3 is a longitudinal transverse sectional view of the subject impact separator taken along section lines 3—3 of FIG. 2.
Figure 4:
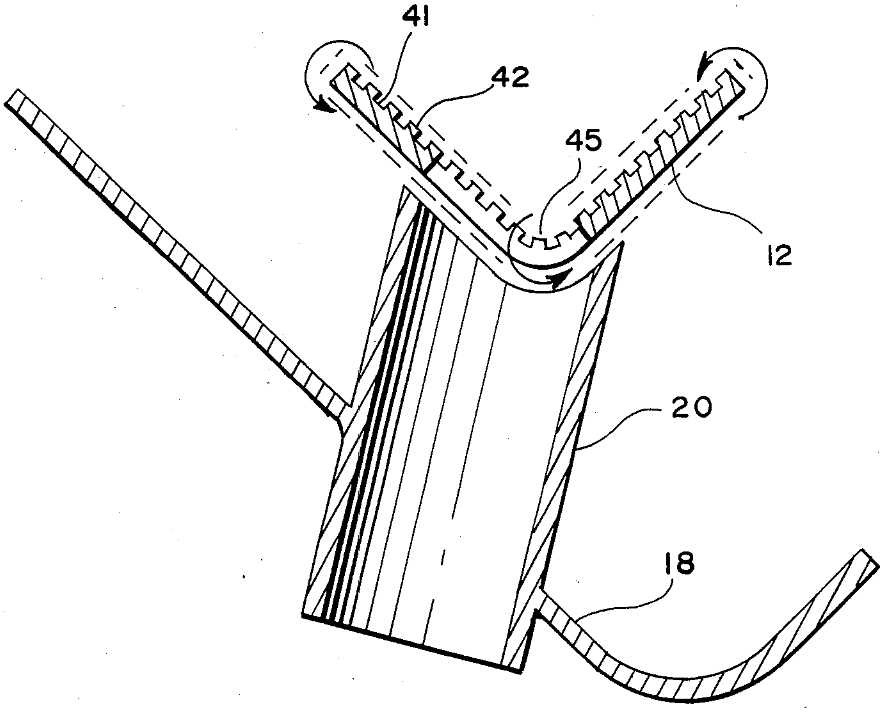
FIG. 4 is an enlarged transverse sectional view in enlarged configuration taken along section line 4—4 of FIG. 2 and showing in particular the cross-section of the V-shaped tray, the trash tray, and the product exhaust.

The V-shaped trough is driven by a motor 21 which is secured to the frame 11 by means of motor frame mount 22 as shown particularly in FIG. 3. The eccentric orbital drive 25 is secured to the drive shaft 26 of the motor 21. The drive shaft 26 of the orbital drive assembly 25 is secured to a tray mount assembly 28 by means of a bracket bolt assembly 29 as shown in the left-hand portion of FIG. 3. At the upper portion of the V-shaped tray 12 the fixed mount assembly 16 includes a rubber mount (resilient) 30 having a V-slot 31 which receives the upper end of the V-shaped trough 12. Again as shown in FIG. 3, a mounting bracket bolt assembly 32 is employed to secure the resilient rubber mount 30 in place and receive the V-shaped upper end of the V-shaped trough 12. Immediately beneath the fixed mount assembly 16 it will be seen in FIG. 3 that trash tray weldments 34 are provided to secure the trash tray to the frame 11. At the lower portion the trash tray is secured to the remote end of the frame 11 by means of weldment 34 shown positioned somewhat beneath the eccentric drive assembly 25. Additionally as shown in FIG. 3 the input hopper 15 has a frustoconical hopper rim 36 at its upper portion, and is fed by a water input 35 which is positioned at the upper extremity of the input hopper 15.

Figure 2:
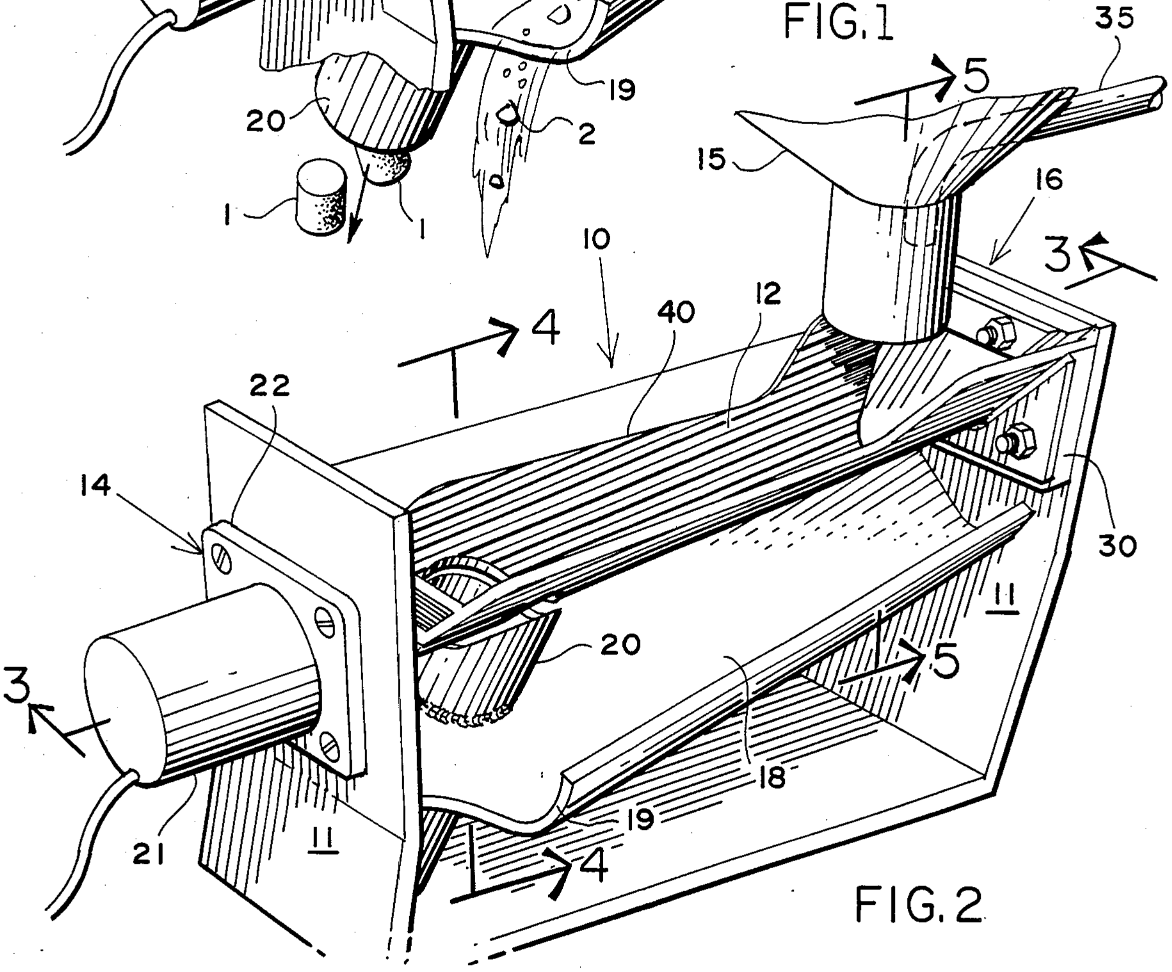
FIG. 2 is a sequential view to FIG. 1 eliminating the input product, trash, and exhaust product and showing in greater detail the fixed mounting of the V-shaped trough and the relationship of the frame to the operating parts.
Figure 5:
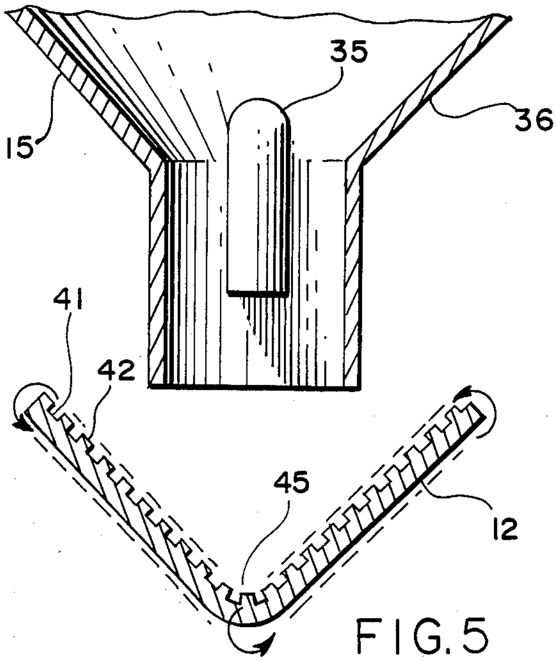
FIG. 5 is another transverse sectional view in enlarged scale taken along section line 5—5 of FIG. 2 and showing particularly the relationship between the V-shaped trough and the input hopper.

As shown in FIGS. 2 and 3 the slope wall edge 40 of the V-shaped trough 12 angles upwardly and outwardly to a point adjacent the product exhaust 20. This angling is somewhat proportional to the amount of impact on the shells as well as the meat as it passes down the V-shaped trough 12 and the orbit effectively becomes greater and greater while the frequency of the orbit remains the same. This upward slope minimizes the effort of any of the meat to escape from the V-shaped trough 12 prematurely. In addition thereto, particularly as shown in FIG. 5, longitudinal grooves and lands are provided in the sidewalls of the V-shaped trough 12. This tends to cause the meat to rotate absorbing the impact while it encourages the shell to surface and be thrown off and discharged into the trash tray 18. To further this action, a curved apex 45 is provided at the bottom of the V-shaped trough 12 at a radius approximately the radius of curvature of the product being processed. This curvature by closely fitting the scallop meat surface and with the addition of water allows atmospheric pressure and the water surface tension to aid in holding the meat in the oscillating V-shaped trough like 2 flat wet plates are often held by the same means.

Figure 6:
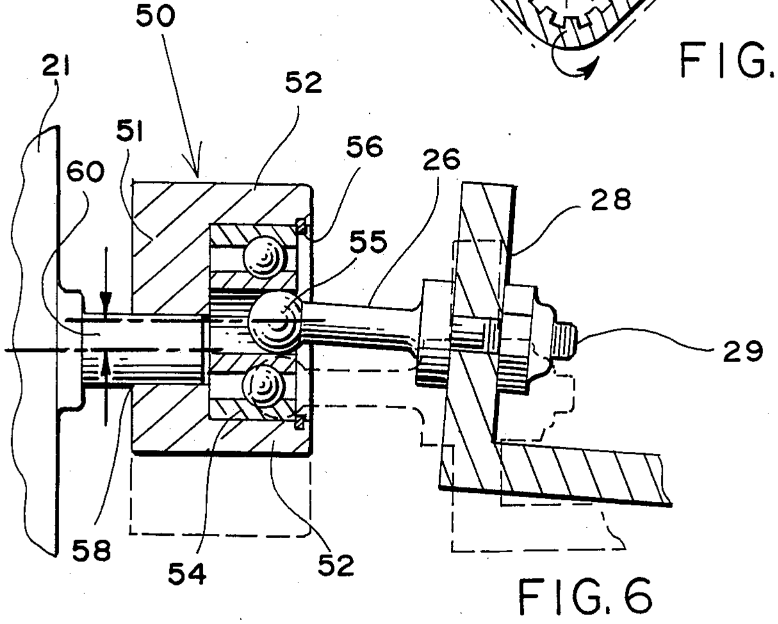
FIG. 6 is an enlarged longitudinal sectional view of the orbital drive assembly.
Figure 7:
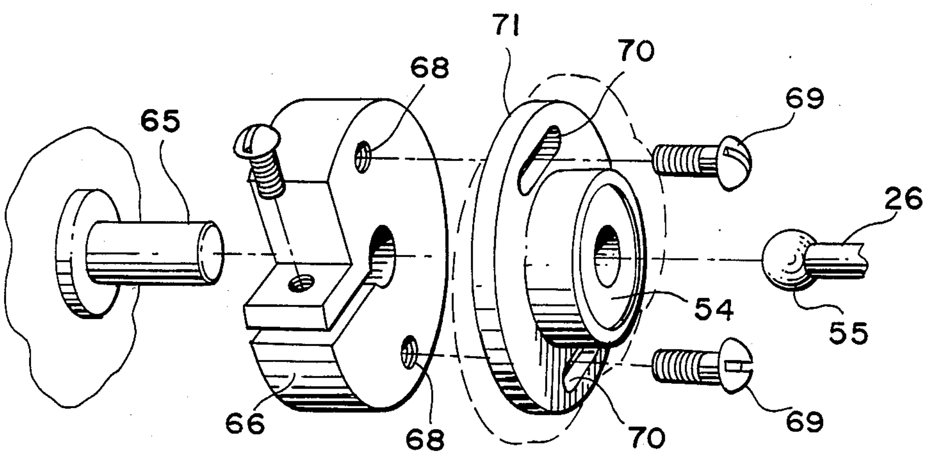
FIG. 7 is an alternative exploded perspective view showing means for variably sizing the amount of the orbit.

The eccentric drive assembly 25 will be better understood by reference to FIG. 6 where it will be seen that an eccentric cup 50 is provided having a cup base 51 and cylindrical cup walls 52. The cup receives a ball bearing 54 secured in place by snap ring 56, and also securing the seat ball end 55 of the drive shaft 26. The shaft cup mount 58 is provided to secure the same to the motor drive shaft.

According to one alternative embodiment, the orbit can be varied. The orbital radius measurement 60 is shown particularly in FIG. 6 where the center line of the ball end 55 is offset from the center line of the motor drive shaft. To vary the amount of orbit the motor shaft 65 is mounted on drive wheel 66 and hole 68 and secured by lock bolt 69. Shiftable drive mount 70 contains bearing 54 to receive the seat ball end 56 of the trough drive shaft 26. Adjustment slides 71 are engaged by lock screws 72 and secured eccentrically in the threaded bores 74 in drive wheel 66.

THE METHOD

The method of the present invention is directed primarily to the optimizing of the operation of an impact separator 10 essentially as disclosed and described. The steps include providing the driving motor 21 with a variable drive to the end that its revolutions per minute can be controlled within a range of as slow as 500 rpm and as rapid as 5000 rpm. In certain applications where larger scallops may be processed, these ranges may require proportional changes. In a typical one inch V-shaped trough operation where the trough is approximately 10 inches long, the optimum orbital speed is between 1500 and 3000 rpm. The optimum orbit is between 0.100 inches and 0.250 inches. The product input is at a rate of 25 to 35 gallons per hour/trough, and water consumption at a rate of 15 to 20 gallons per hour/trough with troughs up to 30 inches in length the vibratory frequency and amplitude does not vary significantly. Testing indicates that strokes or orbit diameters may vary from 0.080" to 0.250" with speed even 4000 to 5000 rpm. On balance, however, better performance appears supported by the higher revolutions per minute. These steps in the method of processing utilizing the impact separator 10 essentially as disclosed and described result in product output of 15 to 25 gallons per hour with the amount of shell and unwanted hard matter reduced to a level where it can be readily tolerated by the opposed counter-rotating rollers of an eviscerator. In certain applications the trash may be recycled separately to salvage any of the meat which may have found its way into the trash tray 18. Similarly where there is an undesirable high quantity of shell remaining after being passed through the impact separator 10 for the first time, it can be repassed through the separator or through a subsequent separator and oftentimes at significantly higher feed rates.

Although particular embodiments of the invention have been shown and described in full here, there is no intention to thereby limit the invention to the details of such embodiments. On the contrary, the invention is to cover all modifications, alternatives, embodiments, usages and equivalents of the subject invention as fall within the spirit and scope of the invention, specification, and the appended claims.

What is claimed is:

1. An impact separator assembly comprising, in combination,
a frame for mounting the assembly,
a trough with its longitudinal axis positioned at an angle downwardly with reference to horizontal mounted to opposed portions of said frame,
vibratory device means for driving at least the lower portion of the trough,
fixed mounting means for the trough at its upper input portion,
means for feeding the trough at its upper input portion with shucked bivalve product which may contain hard unwanted elements of shell, barnacle, and other marine solids,
means for adding a fluid adjacent the means for feeding the trough,
and means for discharging the shucked bivalve product at the lower portion of the trough.

2. In the impact separator of claim 1 above,
a trash tray fixedly secured to the frame and mounted essentially longitudinally beneath the trough.

3. In the impact separator of claim 1,
said vibratory drive means having means for orbitally driving the trough at its lower portion.

4. In the impact separator of claim 3,
said orbital drive means including a cup, bearing means interiorly of the cup, and means for mounting the cup in an eccentric relationship with a motor drive shaft.

5. In the impact separator of claim 3,
said orbital drive means being adjustable to permit varying the amount of eccentricity and orbit.

6. In the impact separator of claim 1,
wherein surface interruptions are formed on the walls of the trough.

7. In the impact separator of claim 6 said interruptions constituting parallel spaced lands and grooves.

8. In the impact separator of claim 1,
the apex of the base of the trough having a curved radius approximating the radius of the shucked bivalve product being separated.

9. In the impact separator of claim 1, said means for discharging comprising a product exit of an essentially cylindrical configuration positioned at the lower portion of the trough.

10. In the impact separator of claim 1, said trough having an end wall immediately downstream of the shucked bivalve product discharging means.

11. In the impact separator of claim 1, said fixed mounting means comprising a resilient mount which nestingly receives the upper input portion of the trough.

12. In the impact separator of claim 1, said trough having a wall at its upper input portion at the end thereof and an enlarged V shaped portion of the trough to form a hopper.

13. In the impact separator of claim 1, said trough descending at an angle between 5° and 30°.

14. In the impact separator of claim 13, a trash tray positioned beneath the trough and having an angle of descent greater than that of the trough.

15. In the impact separator of claim 14, the angle of descent of said trash tray being in the range of 5° to 30° in excess of the angle of the trough.

* * * * *